United States Patent
Nakamura

(10) Patent No.: US 7,796,484 B2
(45) Date of Patent: Sep. 14, 2010

(54) TILT ADJUSTING METHOD AND INFORMATION RECORDING/REPRODUCING APPARATUS USING THE SAME

(75) Inventor: Masaru Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 394 days.

(21) Appl. No.: 12/064,215

(22) PCT Filed: Sep. 19, 2006

(86) PCT No.: PCT/JP2006/318488

§ 371 (c)(1),
(2), (4) Date: Feb. 19, 2008

(87) PCT Pub. No.: WO2007/034771

PCT Pub. Date: Mar. 29, 2007

(65) Prior Publication Data
US 2009/0262618 A1    Oct. 22, 2009

(30) Foreign Application Priority Data
Sep. 21, 2005    (JP)    ............................. 2005-274604

(51) Int. Cl.
    G11B 11/00    (2006.01)
(52) U.S. Cl. ................. 369/53.19; 369/53.42
(58) Field of Classification Search ........... None
    See application file for complete search history.

(56) References Cited
U.S. PATENT DOCUMENTS
2003/0043939 A1    3/2003    Okumura et al.
2005/0117504 A1    6/2005    Ogawa et al.

FOREIGN PATENT DOCUMENTS

| EP | 1 262 971 A2 | 12/2002 |
|---|---|---|
| EP | 1 548 713 A2 | 6/2005 |
| JP | 9-54953 A | 2/1997 |
| JP | 2000-149298 A | 5/2000 |
| JP | 2001-256652 A | 9/2001 |
| JP | 2003-16677 A | 1/2003 |
| JP | 2003-51163 A | 2/2003 |
| JP | 2003-157553 A | 5/2003 |
| JP | 2004-213862 A | 7/2004 |
| JP | 2005-182982 A | 7/2005 |

*Primary Examiner*—Paul Huber
(74) *Attorney, Agent, or Firm*—Sughrue Mion, PLLC

(57) ABSTRACT

[Problems] To effectively perform optimal tilt adjustment. [Means for Solving the Problems] A tilt adjusting method adjusts a tilt angle of an actual incident light and reflected light with respect to an incident light and a reflected light under optimal tilt when recording and reproducing data onto/from an information recording medium. Two or more output signals having a balance between a signal component and a noise component changing with respect to a parameter of a correction object are extracted from the reproduction signal of the information recording medium and the signal component and the noise component are evaluated for performing signal correction, thereby calculating a first and a second coefficient. When the first coefficient is out of a set reference range, the tilt adjustment is performed by the first coefficient and when the first coefficient in the set reference range, the tilt adjustment is performed by the second coefficient.

12 Claims, 9 Drawing Sheets

TILT ADJUSTING METHOD AND INFORMATION RECORDING/REPRODUCING APPARATUS USING THE SAME

This application is a 371 of PCT/JP2006/318488, filed Sep. 19, 2006.

TECHNICAL FIELD

The present invention relates to a tilt adjusting method for adjusting a tilt between an information recording medium and a head section, and to an information recording/reproducing apparatus such as an optical disc device and the like using the same.

BACKGROUND ART

An optical disc device is a device for recording information or reading out recorded information on/from an optical disc using an optical head. In the optical disc device, a tilt angle between the optical disc and the optical head affects a performance of the device. If there is no tilt between the optical disc and the optical head, an information recording surface of the optical disc is irradiated with a better laser beam, and better recording/reproducing is performed. However, a tilt is generated between the optical disc and the optical head, an aberration occurs in a laser beam with which the information recording surface of the optical disc is irradiated, which deteriorates a recording/reproducing performance.

In general, the tilt includes a radial tilt and a tangential tilt. The radial tilt is a tilt between a vertical direction of a recording surface of an optical disc and a radial direction of an optical head. The tangential tilt is a tilt between the vertical direction of a recording surface of an optical disc and a direction vertical to the radial direction of an optical head (an optical head scanning direction).

FIG. 5 shows a relationship between an error rate and a radial tilt. FIG. 5 indicates clearly that the error rate increase when the radial tilt occurs. It expresses that a recording/reproducing performance is extremely deteriorated by occurrence of the radial tilt. Therefore, various methods are proposed for correcting the radial tilt to improve a reproduction signal.

For example, Patent Document 1 discloses a method in which an optical disc is irradiated with one main beam and two sub beams to detect a tilt, and the optical disc or an optical head is controlled so as to eliminate the tilt by using a tilt detecting signal.

Patent Document 2 discloses a method in which a quadrant photodetector is used and a radial tilt is detected based on a light volume balance of detectors in right and left sides with respect to an optical head operating direction (detectors divided in the radial direction), and a tangential tilt is detected based on a light volume balance of detectors in back and forth with respect to an optical head operating direction (detectors divided in a scanning direction) respectively so as to control those tilts.

Patent Document 3 discloses a method in which a rate of outputs from detectors in right and left sides with respect to an optical head operating direction (detectors divided in the radial direction) is varied along with the tilt. With this, an adverse effect due to the tilt can be eliminated by means of such as signal processing, without performing tilt control mechanically.

Patent Document 4 discloses a method in which an optical disc is irradiated with three or five beams, and a tilt is detected by using intensity of reflection of each beam. Then, depending on the tilt degree, one beam indicating the best reproduction signal quality is selected from among those three or five beams, and reproduced.

Patent Document 5 discloses a method in which a DPP and DPD signals are generated by using detection signals in a main spot and both side spots, or in the both side spots. A tilt angle of the optical disc is detected based on a subtracting value of those signals, and then a tilt angle is detected and controlled.

However, techniques in Patent Documents 1, 4 and 5 need a plurality of beams to be emitted, which leads to a complicated optical head. That is a great disadvantage. Further, the tilt detecting signal is obtained with no direct relationship to a recorded signal or a reproduction signal. Therefore, a recording or a reproducing characteristic is not necessarily improved optimally.

Further, the technique in Patent Document 4 uses one output from the three or five beams as a reproduction signal. In this case, each beam has to have a certain degree of light intensity from a viewpoint of obtaining a high SNR. Namely, a significantly high-powered laser diode is required to be used. That is not realistic.

A technique in Patent Document 2 has a comparably simple structure. However, the tilt detecting signal is not sufficiently accurate in such tilt detection. That is not practical.

A technique in Patent Document 3 also has a comparably simple structure. However, the largest problem exists in a way to set degrees to vary the rate of outputs from detectors divided in the radial direction. That is, in order to determine the degree to vary the output rate from the detectors, an optimal point needs to be obtained by measuring a jitter and an error rate with varying the output rate of the detectors. In this case, the error rate is an index indicating a difference between a bit string recorded actually and a bit string reproduced and decoded, and calculated by (an error bit)/(a total bit). The jitter and the error rate are values without polarity. Accordingly, when such a parameter is used for the adjustment, in a case with adjusting the tilt for example, an adjusting direction is unclear with respect to the tilt to be optimal state. Therefore, the tilt adjustment is performed with varying the tilt in positive and negative to fine the optimal point for a signal. Such a method is so-called a hill climbing. It takes a long time to learn for the optical disc device, and it is a serious deterioration in a comprehensive performance of the optical disc device. Further, Patent Document 3 also discloses a method in which information about the degree to vary the output rate is obtained in advance. However, the hill climbing is still necessary to obtain the information, and in addition, a tilt amount can be changed with the passage of time (a tilt is varied due to a temperature of an optical disc device or a humidity of an environment), so that sufficient accuracy cannot be expected with a correction amount previously stored.

Patent Document 1: Japanese Patent Application Laid-open No. 2003-157553

Patent Document 2: Japanese Patent Application Laid-open No. 2003-016677

Patent Document 3: Japanese Patent Application Laid-open No. 2001-256652

Patent Document 4: Japanese Patent Application Laid-open No. 09-054953

Patent Document 5: Japanese Patent Application Laid-open No. 2000-149298

Patent Document 6: Japanese Patent Application Laid-open No. 2004-213862

DISCLOSURE OF THE INVENTION

Problems to Be Solved By the Invention

In most of tilt detecting methods known at present, a tilt detection itself is indirectly performed using a signal different from an actual reproduction signal. Therefore, in many cases, an optimal tilt point for a reproduction signal quality is different from an optimal tilt point which is determined by the tilt detecting signal. Thus, regarding that an object is to improve the reproduction characteristic optimally, the detection is not sufficiently accurate.

Therefore, an object of the present invention is to provide a tilt adjusting method and the like for adjusting a tilt precisely and easily.

Means of Solving the Problems

The present invention is achieved based on the following knowledge. A most preferable method is a method with which a tilt is adjusted directly by using a reproduction signal, and a measure to realize it is a PRSNR. The PRSNR is an abbreviation for Partial Response Signal to Noise Ratio. It means an error index that is a ratio between a path interval, where a Euclidean distance is short and an error easily occurs, and a noise, and the ratio is calculated by using a reproduction signal according to combination of PR (Partial Response equalization) and ML (Maximum Likelihood decoding). That is described in detail in Patent Document 6, for example.

The PRSNR can be obtained directly from the reproduction signal. Accordingly, a higher value is obtained when the reproduction signal is in good condition, and a low value is obtained when the reproduction signal is in bad condition, and this correlates with a tilt. The reproduction signal with a high value is obtained when the tilt is optimal, and the reproduction signal with a low value is obtained when the tilt is deteriorated.

Therefore, the following technique can be considered. Each PRSNR ($PRSNR_1$, $PRSNR_2$) for signals I1 and I2 obtained by each divided photodetector which is divided into two in the radial direction is used in a following equation to obtain a coefficient k, and the coefficient k is used to adjust a tilt.

$$k=(PRSNR_2-PRSNR_1)/PRSNR$$

$PRSNR_1$ and $PRSNR_2$ express PRSNRs of the signals I1 and I2 respectively. The PRSNR in a denominator is a PRSNR for a summation of the signals I1 and I2 (an RF-sum). With dividing a difference between $PRSNR_1$ and $PRSNR_2$ by the PRSNR, the coefficient k is prevented from varying depending on absolute values of the PRSNRs for each signal even with the tilts in the same condition. That is so-called normalization.

FIG. 6 shows a relationship between aforementioned each PRSNR of I1, I2, I1+I2 (the RF-sum), a tilt, and the coefficient k. This is a graph in a case where each signal can be obtained almost ideally, ignoring a problem which will be described later.

The PRSNR for the signals I1+I2 (the RF-sum) draws an almost biraterally-symmetric mountain shaped curve centering a point of 0 tilt (that is, an optimal tilt). The PRSNRs for I1 and I2 draw two mountain shaped curves in right and left centering the tilt 0 point. Peaks thereof are positioned in opposite sides to each other, and have the same amount of absolute values in the tilt, which mean the shift from the tilt 0 point. Then, a point in which the coefficient k is 0 is so called an optimal tilt, and the optimal tilt between an optical head and a disc surface makes a recording or a reproducing characteristic optimal.

Next, an example of problem will be presented. Ideally, the mountain shaped curves for I1 and I2 are in almost the same height, that is, best values of the PRSNRs (peak values) are nearly the same. However, the best values (the peak values) are not always nearly the same. That is shown in FIG. 7. The mountain shaped curve for I2 is formed having a PRSNR best value lower than the one of I1. That is caused by several factors such as a difference in sensitivity of two elements of the photodetector divided into two, a temporal change, and the like.

The problem due to the difference in a formation of the mountain shaped curve will be described as the tilt 0 is a best tilt for reproduction in this case. When one of those mountain shaped curves is lower than the other, it is easily known that a point in which the coefficient k is 0, namely, an intersecting point for the PRSNR mountains of I1 and I2, is not the tilt 0 point. Small difference in the heights of the mountain shaped curves (the peak values of PRSNRs) does not affect the performance so much. However, the greater the difference becomes, the farther the point in which the coefficient k is 0 becomes from the tilt 0 point. Accordingly, the best tilt for reproduction is not reached. Consequently, the error rate is likely to be increased, and the reproduction performance becomes deteriorated.

An advantageous aspect of adjusting a tilt by using the PRSNR of the signals I1 and I2 is that a tilt direction can be obtained by the coefficient k. When the coefficient k is a positive value, the tilt is adjusted toward a negative direction. When the coefficient k is negative, the tilt is adjusted toward a positive direction. Control as above makes the coefficient k be 0, and the optimal tilt can be obtained. Thus, it is advantageous in that so-called the hill climbing, which requires a tilt to be moved to a positive and negative area to find whichever includes an optimal tilt, does not necessary.

However, the above method can be applied only when the mountain shaped curves are in almost the same height. Otherwise, the point in which the coefficient k is 0, namely, the intersecting point of the mountain shaped curves of PRSNR for I1 and I2, becomes far from the tilt 0 point. It is easily known from FIG. 7 that the intersecting point becomes farther from the tilt 0 point when the mountain shaped curve of PRSNR of I2 becomes lower. If the tilt direction is determined only depending on whether a coefficient k is a positive value or a negative value in such circumstances, there is such a risk that the tilt is directed toward a direction opposite to a direction for recording or reproducing to be the best.

Specifically, it is clear from FIG. 7 that a tilt is to be directed toward the negative direction because the PRSNR of I1 is higher than the PRSNR of I2 in the right side of the tilt 0 point. Meanwhile, the PRSNR of I1 is still higher than the PRSNR of I2 because the mountain shaped curve of PRSNR of I2 is lower. Accordingly, the coefficient k is a positive value at this point. If the tilt is adjusted to the negative direction, the tilt is adjusted so as to set the intersecting point apart from the tilt 0 point that is originally an ideal position.

Further, as an extreme example, cases can be considered in which the PRSNRs of I1 and I2 cannot be detected well, and in which curves of the PRSNRs for I1 and I2 do not in a mountain shape, and the like. FIG. 8 shows an example in which the PRSNR of I2 cannot be detected better than the case in FIG. 7. FIG. 9 shows an example in which the PRSNRs of I1 and I2 do not form a mountain shaped curve well. The tilt can never be adjusted by relying on the coefficient k in FIG. 8. The coefficient k is totally unreliable in FIG.

9. One of reasons for the above can be considered that each signal level is deteriorated because a signal is divided into I1 and I2, which affects PRSNR detection in a producing system.

It is impossible to adjust a tilt by relying on the coefficient k only in such circumstances. In that case, a tilt is surly adjusted based on the PRSNR according to I1+I2 (the RF-sum) directly. Off course, there is a suspicion whether the PRSNR of I1+I2 (the RF-sum) is reliable or not when the PRSNR of I2 cannot be detected normally. However, as a result, there is almost no problem even if some influence still remains.

The present invention is achieved based on the aforementioned knowledge. That is, the tilt adjusting method according to the present invention includes steps of: dividing and detecting a signal recorded on an information recording medium by a plurality of detectors in a head section; generating a first and a second signals by using the divided and detected signals independently or by using them added each other; calculating a first coefficient corresponding to a difference between SN ratios of the first and the second signals; generating a third signal composed of a summation of at least the first and the second signals; calculating a second coefficient corresponding to a SN ratio of the third signal; and adjusting a tilt between the information recording medium and the head section by using the first coefficient when the first coefficient is out of a range between a predetermined value 1 and a predetermined value 2 which are set in advance, and by using the second coefficient when the first coefficient is within a range between the predetermined value 1 and the predetermined value 2.

A graph is considered taking a tilt angle between the information recording medium and the head section as a horizontal axis, and an SN ratio of a signal detected by the detector as a vertical axis. In this case, the SN ratio declines because signal detection becomes more difficult as an absolute value of the tilt angle becomes larger. Accordingly, the graph has a parabolic curve with a peak positioned near the tilt angle 0. In that case, with respect to the plurality of detectors, not all of them are at a center of the head section, so that the peaks of the SN ratios of each signal from the plurality of detectors are spread near the tilt angle 0. Consequently, the difference between the SN ratios of the first and the second signals becomes like a substantial straight line almost proportional to the tilt angle. However, the SN ratios of the first and the second signals do not always intersect with each other at the tilt angle 0, accordingly, the difference between the SN ratios 0 is not necessarily to be the tilt angle 0. Meanwhile, the SN ratio of the summation of the first and the second signals is in a curve like a parabola having a peak at the tilt angle 0 because the SN ratio of the summation of the first and the second signals becomes close to an SN ratio of a signal from a detector at a center of the head section. Therefore, when the first coefficient is out of the range from the predetermined value 1 to the predetermined value 2, a tilt is adjusted by using the first coefficient which is calculated based on the difference between the SN ratios of the first and the second signals. In that case, the tilt can be adjusted easily without using the hill climbing method. On the other hand, when the first coefficient is in the range between the predetermined value 1 and the predetermined value 2, the tilt is adjusted by using the second coefficient which is calculated based on the SN ratio of the summation of the first and the second signals. In that case, the tilt can be adjusted more precisely than the case using the first coefficient.

Further, when the SN ratios of the first and the second signals are expressed by SNR1 and SNR2, the SN ratio of the third signal is expressed by SNR3, the first and the second coefficients are expressed by k1 and k2, and a proportional constant is expressed by A, the first and the second coefficients may be calculated according to the following equation;

$$k1=A(SNR2-SNR1), k1=(SNR2-SNR1)/SNR3, \text{ or } k1=(SNR2-SNR1)/(SNR1+SNR2)$$

$$K2=SNR3$$

Furthermore, SNR1, SNR2 and SNR3 may be the PRSNRs of the first, the second and the third signals. In addition, the information recording medium may be an optical disc, the head section may be an optical head, and the first coefficient may be calculated by the following equation $k1=(SNR2-SNR1)/SNR3$, and the predetermined value 1 may be +0.1, the predetermined value 2 may be −0.1.

Moreover, the information recording/reproducing apparatus according to the present invention is an information recording/reproducing apparatus for performing at least any one of signal recoding and signal reproducing for the information recording medium, the apparatus includes: a head section including a plurality of detectors capable of dividing a signal recorded on the information recording medium into at least two or more and detecting them; a first coefficient calculating unit for generating a first and a second signals by using the divided and detected signals independently or by using them added each other, and for calculating a first coefficient corresponding to a difference between SN ratios of the first and the second signals; a second coefficient calculating unit for generating a third signal by adding signals including the first and the second signals, and for calculating a second coefficient corresponding to an SN ratio of the third signal; and a tilt adjusting unit for adjusting a tilt between the information recording medium and the head section by using the first coefficient when the first coefficient is out of a range between a predetermined value 1 and a predetermined value 2 which are set in advance, and using the second coefficient when the first coefficient is in the range between the predetermined value 1 and the predetermined value 2.

In other words, the present invention may be structured as follows. The tilt adjusting method during reproducing from a disc, and the apparatus therefor includes: an optical head including a detecting section capable of dividing a signal recorded on an information recording medium into at least two and detecting them; a coefficient calculating unit in which two kinds of signals I1 and I2 are generated by the divided and detected signals used independently or added partially with each portion, and a signal I3 is generated by adding signals including the I1 and I2 are used to calculate a ratio between a signal component and a noise component in each signal I1, I2 and I3, and a coefficient k1 is calculated by using the ratio between the signal component and the noise component calculated from the signals I1 and I2, in addition, a coefficient k2 is calculated using the ratio of between the signal component and the noise component calculated from the signal I3; and a mechanism for adjusting a tilt between the information recording medium and the optical head by using the coefficient k1 when the coefficient k1 is out of a range between a predetermined value 1 and a predetermined value 2, and by using the coefficient k2 when the coefficient k1 is in a range between the predetermined value 1 and the predetermined value 2.

Further, when the ratios between the signal component and the noise component of the signals I1, I2, I3 are expressed by SNR1, SNR2, and SNR3 respectively, the coefficient k1 may be calculated by an equation proportional to a difference between an SNR1 and an SNR2, or the coefficient k1 may be calculated by an equation, k1=(SNR2−SNR1)/SNR3, or k1=(SNR2−SNR1)/(SNR1+SNR2), and the coefficient k2 may be the SNR3. In that case, those SNR1, SNR2, SNR3 may be the PRSNRs of I1, I2, and I3 respectively. Furthermore, the predetermined value 1 may be +0.1, and the predetermined value 2 may be −0.1.

ADVANTAGEOUS EFFECT OF THE INVENTION

According to the present invention, the first and the second signals are generated based on a signal divided and detected by the plurality of detectors, the first coefficient is calculated based on the difference between the SN ratios of the first and the second signals, the second coefficient is calculated based on the SN ratio of the third signal obtained by adding signals including the first and the second signals, and tilt adjustment is performed precisely and easily by adjusting a tilt between the information recording medium and the head section by using the first coefficient when the first coefficient is out of the range between the predetermined value 1 and the predetermined value 2, and by using the second coefficient when the first coefficient is in the range between the predetermined value 1 and the predetermined value 2. That is, the present invention is widely applied to a recording/reproducing apparatus performing the tilt adjustment for a high density recording apparatus and to a recording/reproducing method, and the reliability of the recording/reproducing apparatus can be increased very much.

BEST MODE FOR CARRYING OUT THE INVENTION

Hereinafter, an exemplary embodiment of the present invention will be explained with reference to drawings.

An information recording/reproducing apparatus according to Exemplary embodiment 1 includes, as shown in FIG. 1, a spindle driving system 1 for driving an optical disc 15, an optical head 2 for irradiating the optical disc 15 with a light beam and detecting a reflected light from the optical disc 15, an RF circuit section 3 for performing a process, such as a filtering, for an input signal, an impulse response calculator 4 for obtaining an impulse response of the input signal, a coefficient calculator 5 for obtaining coefficients $k_1$ and $k_2$ based on the obtained impulse response and the input signal, a demodulator 7 for demodulate the input signal, a system controller 8 for managing the whole apparatus, a modulator 9 for modulating a signal to be recorded, an LD driving system 11, and a servo controller 20 for controlling a servo signal.

The optical head 2 includes an objective lens 13, a laser diode 10, a light receiving section 14, a beam splitter 16, and IV amplifiers 21 and 22. The laser diode 10 drives under control of the LD driving system 11. The beam splitter 16 reflects a light beam from the laser diode 10 to the objective lens 23, and a light beam from the objective lens 23 transmits to the light receiving section 14.

In Exemplary embodiment 1 shown in FIG. 1, the coefficients $k_1$ and $k_2$ are calculated by the coefficient calculator 5 based on the impulse response obtained by the impulse response calculator 4 and the input signal, and a tilt angle is adjusted based on the coefficients $k_1$ and $k_2$.

In Exemplary embodiment 1 shown in FIG. 1, a dual photodetector which is divided in the radial direction is used for the light receiving section 14. In the dual photo detector as the light receiving section 14, a portion of incoming light beams detected by an inside part of the light receiving section with respect to the radial direction is outputted as the signal I1, and a portion of incoming light beams detected by an outside part of the light receiving section is outputted as the signal I2. Generally, the output from the light receiving section 14 is a current. Accordingly, the signals I1 and I2 are converted from current values to voltage values by the IV amplifiers 21 and 22, and then outputted. The summation of the signals I1 and I2, that is, I1+I2, is a usual reproduction signal. In the present exemplary embodiment, the signals I1 and I2 are two kinds of signals into which a signal is divided in the radial direction. Therefore, a radial tilt is adjusted when the radial tilt is varied. Of course, if a signal is divided into the tangential direction, a tangential tilt is adjusted when the tangential tilt is varied.

In the present exemplary embodiment, the dual photodetector is used as the light receiving section 14, however, the light receiving section is not limited by the above example. A quadrant photodetector shown in FIG. 2, which is composed of photoreceivers 30a, 30b, 30c and 30d, may be used as the light receiving section 14 shown in FIG. 1. The quadrant photodetector as the light receiving section 14 outputs two of the signals I1 and I2 combining signals received by each of the four-divided photoreceiver 30a, 30b, 30c, and 30d accordingly. Various structures can be used as the light receiving section 14.

The point of the present exemplary embodiment is that two or more kinds of outputs in which the signal component and the noise component are included respectively in various balances are taken out with respect to a parameter to be corrected, and signal correction is performed by evaluating those of the signal component and the noise component. Therefore, the light receiving section 14 may be anything as long as it takes out two or more kinds of outputs in which the signal component and the noise component are included respectively in various balances with respect to the parameter to be corrected. Further, the photodetector is not limited by dual or quadrant structures.

When the dual photodetector is used, a signal recorded on the optical disc 15 is outputted from two sections of the divided detector respectively as divided and detected signals. Accordingly, each signal generates the signals I1 and I2 independently. On the other hand, when the quadrant photodetector is used, a signal recorded on the information recording medium is outputted from four sections of the divided detector respectively as a signal divided into four signals. Then, two signals are combined to generate two kinds of the signals I1 and I2.

The signals I1 and I2 are inputted into the RF circuit section 3, and an equation, I1+I2 (a reproduction signal=the RF sum), is performed. The signal is processed with a filtering, an equalizing, a PLL, and the like. When PRML is used, a Viterbi decoding is also performed. For reference, a block diagram showing the RF circuit section 3 used in this case is presented in FIG. 3. The RF circuit section 3 is composed of a prefilter 100, an automatic gain controller (AGC) 101, A/D converter (ADC) 102, a phase-locked loop (PLL) 103, an adaptive equalizer 104, and a Viterbi decoder 105.

The RF circuit section 3 transmits information such as a timing signal (a clock) whose phase is aligned by the PLL, an ideal waveform which is assumed according to the Viterbi decoding, and the like to the impulse response calculator 4. The impulse response calculator 4 samples the signals I1 and I2 in a timing of the clock, and compares the sampled signal and an ideal waveform assumed by the Viterbi decoding so as to calculate each impulse response of the signals I1 and I2. When the impulse response calculator 4 does not include the Viterbi decoder 105 shown in FIG. 3, an impulse response may be calculated using a signal whose data string is previously known.

Information on the impulse response calculated by the impulse response calculator 4 is transmitted to the coefficient calculator 5. The coefficient calculator 5 calculates the coefficients k1 and k2 based on the impulse response obtained by the impulse response calculator 4 and the input signal. Equations used for the calculation are Equations 1 and 2 which will be presented later. The noise component is calculated as a difference between a waveform calculated with convolution integral of the data string and the impulse response and an actual signal waveform (the signals I1 and I2 sampled at the clock timing). If the noise component is calculated at every time (at every clock timing), expected values of each type of noises are easily calculated. When a system has the Viterbi decoder, the data string from the Viterbi decoder may be used. When a system does not include the Viterbi decoder, a signal whose data string is previously known may be used for the calculation.

The coefficient calculator 5 evaluates the signal component and the noise component in two or more kinds of output signals (which are extracted based on the signal reproduced from the optical disc 15) which includes the signal component and the noise component in various balances with respect to a parameter to be corrected, and performs signal correction, and then calculates the first coefficient $k_1$ and the second coefficient $k_2$.

Specifically explaining, the coefficient calculator 5 uses the signals I1 and I2 which are generated from the aforementioned two or more output signals used independently or added partially with each portion, and the signal I3 generated by adding output signals including the signals I1 and I2. Then, the coefficient calculator calculates the first coefficient $k_1$ working out the ratio between the signal component and the noise component of each of the signals I1, I2, I3, and also calculates the second coefficient $k_2$ using the ratio between the signal component and the noise component which are worked out from the signal I3.

When the ratio between the signal component and the noise component of the signals I1, I2, I3 are expressed by SNR1, SNR2, SNR3, and the first coefficient is $k_1$, the second coefficient is $k_2$, the proportional constant is A, The coefficient calculator 5 calculates;

$k_1 = A(SNR2 - SNR1)$, $k_1 = (SNR2 - SNR1)/SNR3$, or $k_1 = (SNR2 - SNR1)/(SNR1 + SNR2)$, and $k_2 = SNR3$.

In this regard, the SNR1, the SNR2 and the SNR3 are the PRSNRs for the signals I1, I2 and I3 which indicate an error index calculated by a ratio between a path interval, where a Euclidean distance is short and an error easily occurs, and a noise. The ratio is calculated using a reproduction signal according to combination of partial response equalization and maximum likelihood decoding.

In the present exemplary embodiment, the RF circuit section 3 including the Viterbi decoder for PR (12221) is prepared, and the impulse response calculator 4 outputting an ideal impulse response, (1,2,2,2,1) is prepared. Of course, the coefficient calculator 5 is capable of PRSNR calculation.

According to a calculated result for the coefficients $k_1$ and $k_2$, the system controller 8 compares the received coefficients $k_1$, $k_2$ and a set value, and indicates tilt control to the servo controller 20 (including tilt control) using the coefficients k1 and k2 accordingly. Then, a tilt is adjusted optimally under the control of the servo controller 20.

The servo controller (include the tilt control) includes a tracking servo for tracing a guide groove of the optical disc and a pit, a focus servo for controlling an interval between the optical disc 15 and the optical head 2, and a tilt servo for adjusting a tilt angle formed in between an incoming light beam emitted from the optical head 2 and injected into the optical disc 15, a reflected light beam reflected from the optical disc 15 and injected into the optical head 2, and, the incoming light beam and the reflected light beam with the optimal tilt. Hereinafter, a case will be explained where the servo controller 20 is used for the tilt servo which controls a tilt of the optical head 2 so as to control a tilt angle formed in between an actual incoming light beam and a reflected light beam, and a tilt angle formed in between the incoming light beam and the reflected light beam with the optimal tilt.

The tilt servo by the servo controller 20 controls a lens tilt to change only a tilt of an objective lens 13 which irradiates a surface of the optical disc 15 with a light beam and corrects a reflected light beam from the optical disc 15, a head tilt to change a tilt of the actuator (head) section including the objective lens 13, and a spindle tilt to change a tilt of the spindle driving system 1 which rotates the optical disc 15. The tilt control performed by the above mentioned tilt servo is for adjusting a tilt of the optical disc 15 and the optical head 2 optimally with any method. The tilt servo in the servo controller 20 according to the present exemplary embodiment performs the tilt control by using the coefficients $k_1$ and $k_2$.

Hereinbefore, The tilt servo has been described as the tilt servo by the servo controller 20 which controls the tilt of the optical head 2 so as to adjust the tilt angle formed in between actual the incoming light beam and the reflected light beam, and the incoming light beam and the reflected light beam with an optimal tilt. However, it is not limited by the above. That is, the tilt angle formed in between the actual incoming light beam and the reflected light beam, and the incoming light beam and the reflected light beam with the optimal tilt may be adjusted by using a liquid crystal aberration correction element disposed on an optical path formed in between the optical head 2 and the optical disc 15. In this case, the incoming light beam and the reflected light beam with the optimal tilt mean an incoming light beam and a reflected light beam vertical to the optical disc 14, however, they are not limited. That is, as long as the incoming light beam and the reflected light beam with the optimal tilt are injected or reflected into/from the optical disc 14 without any aberration, the incoming light beam and the reflected light beam with the optimal tilt are not limited by the incoming light beam and the reflected light beam vertical to the optical disc 14.

Next, with reference to a flowchart in FIG. 4, a tilt adjusting method in the information recording/reproducing apparatus of the present invention will be explained.

The coefficients $k_1$ and $k_2$ are calculated by using the PRSNRs for each of the output signals I1 and I2 from the photodetector divided into two in the radial direction (Steps 201-203), where the coefficients $k_1$ and $k_2$ are calculated based on the following equations (1) and (2);

$$\text{Coefficient } k_1 = (PRSNR_{I2} - PRSNR_{I1})/PRSNR_{I1+I2} \quad (1)$$

$$\text{Coefficient } k_2 = PRSNR_{I1+I2} \quad (2)$$

In the equations (1) and (2), the $PRSNR_{I1}$ is the PRSNR of the signal I1, the $PRSNR_{I2}$ is the PRSNR of the signal I2, and the $PRSNR_{I1+I2}$ is the PRSNR of the summation signal of I1+I2 (the RF-sum).

A tilt is adjusted so that the coefficient $k_1$ is to be 0. However, as mentioned above, the position where the coefficient $k_1$ is 0 is not always the optimal tilt. It is still advantageous in usage of the coefficient $k_1$ as follows. A first advantageous point is that a direction to which a tilt is to be adjusted can be know when its polarity is known. It is clear from FIG. 7 (k in the drawing is the same as $k_1$) that the tilt is adjusted toward the negative direction when the coefficient $k_1$ is positive, and the tilt is adjusted toward the positive direction when the coefficient k1 is negative. A second advantageous point is that an adjusting amount in the tilt adjustment can be specified in accordance with an absolute value of the coefficient $k_1$. For example, assuming that the coefficient $k_1$ is +0.1 and +0.2. A tilt in the case with the coefficient $k_1$ of +0.2 needs to be adjusted twice time as much as a tilt in the case with the coefficient $k_1$ of +0.1. If the coefficient $k_1$ is calculated at every tilt amount and learnt in advance, such as when a disc is inserted, the adjusting amount can be determined uniquely after that.

Despite those advantageous points, there is a still problem in which the coefficient $k_1$ of 0 is not always the optimal tilt. Therefore, the tilt adjustment is performed with the coefficient $k_1$ at a point in which the coefficient $k_1$ is far from 0. The direction for tilt adjustment can be determined depending on the polarity at the distant point, and the tilt amount can be determined based on the position where the coefficient $k_1$ is 0 (it is roughly near the optimal tilt).

Specifically, when the coefficient $k_1$ is out of the range of the predetermined values, out of the range such as $-0.1 < k_1 < +0.1$ (No in Step 204), the tilt adjustment is performed by using the coefficient $k_1$ (Step 205). When the coefficient $k_1$ is in the range of the predetermined values, in the range of such as $-0.1 < k1 < +0.1$ (Yes in Step 204), the tilt adjustment is performed by using the coefficient $k_2$ (Step 206). Taking FIG. 7 as an example, when the coefficient $k_1$ is out of the range between +0.1 and −0.1, that is the range where the coefficient $k_2$ is away from around the peak of a mountain shaped curve, and at a slope therefrom down toward a bottom, the tilt is adjusted by using the coefficient $k_1$. When the coefficient k1 is in the range between +0.1 and −0.1, that is the range where the coefficient $k_2$ is near the peak of the mountain shaped curve, the tilt is adjusted by the coefficient $k_2$. It is because obtaining a best value of the PRSNR of I1+I2 (the RF−sum), which is the coefficient $k_2$, is to be a most reliable detection for the optimal tilt (Steps 206-209).

FIG. 6 shows the ideal status and the operation as in FIG. 7 can be realized in this case. FIGS. 8 and 9 show extreme examples, and a tilt is not practically adjusted by using only the coefficient $k_1$ in those cases. However, even in the cases, the optimal tilt can be obtained by switching to the tilt adjustment using the coefficient $k_2$ when the coefficient $k_1$ is in the range between +0.1 and −0.1. Thus, the optimal tilt can be obtained efficiently if the coefficients $k_1$ and $k_2$ are used together, the coefficient $k_1$ is for coarse adjustment and the coefficient $k_2$ is for fine adjustment.

The PRSNR used for the coefficients can be obtained directly form the reproduction signal. Therefore, variation of the reproduction signal according to a tilt can be detected with high accuracy, which is highly efficient. An operation is possible in which the PRSNR is monitored, and the coefficients $k_1$ and $k_2$ are obtained when the PRSNR becomes under some threshold, and then a tilt is adjusted.

Needless to say, the present invention is not limited by the aforementioned exemplary embodiment. For example, the coefficient $k_1$ is assumed to be from +0.1 to −0.1, however, it is not limited so. The above value of the coefficient $k_1$ is most suitable for the case of FIG. 7, but an optimal value may be used accordingly depending on an apparatus and the coefficient $k_1$.

The coefficient $k_1$ is expressed as the equation (1), however, the denominator may be changed to $PRSNR_{f1} + PRNSR_{f2}$. The essential point is a difference between $PRSNR_{f1}$ and $PRSNR_{f2}$ obtained in the numerator. Therefore, any other appropriate signal values may be used for the denominator as long as the proportion between the coefficient $k_1$ and the difference between the $PRSNR_{f1}$ and the $PRSNR_{f2}$ can be maintained. Moreover, the coefficient $k_2$ may be exchanged for $PRSNR_{f1} + PRSNR_{f2}$. In this case, a level of sensitivity is almost the same as the case with the $PRSNR_{f1+f2}$.

In a case with the quadrant photodetector, I1 is usually to be $30a+30d$, and I2 is to be $30c+30d$, I1+I2 is $30a+30b+30c+30d$, indicating with FIG. 2. However, I1 may be $30a$ or $30b$, I2 may be $30c$ or $30d$, and I1+I2 may be a configuration including at least I1 and I2, such as $30a+30d$ or $30a+30b+30c+30d$ in a case where I1 is $30a$ and I2 is $30d$.

The above mentioned is about the PRSNR, however, the PRSNR is not limited to be used and anything may be replaced the PRSNR, as long as a tilt can be corrected by using followings together, a difference of output balances of indexes based on each or combined signal from a photodetector divided into two or more, and an index based on a signal obtained from a summation of each signal.

It has been presented to perform the radial tilt adjustment with the photodetector divided into two in the radial direction, however, the tangential tilt can be adjusted in the same way by dividing a photodetector into two in a tangential direction. Further, the present invention is applicable to other characteristics than the tilt, such as defocus, detrack, and the like if a signal structure in which the signal is divided and detected is changed accordingly to detect a characteristic to be corrected.

The PRSNR in the class of PR(12221) is used in the above, however, the PRSNR in other classes such as PR(1221) and the like can be used in the same way. Further, the case in which the PRML is used is described in the above exemplary embodiment, however, the present invention can be applied to a system in which the PRML is not used, in the same way.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2005-274604, filed on Sep. 21, 2005, the disclosure of which is incorporated herein in its entirety by reference.

REFERENCE NUMERALS

Figure 1:
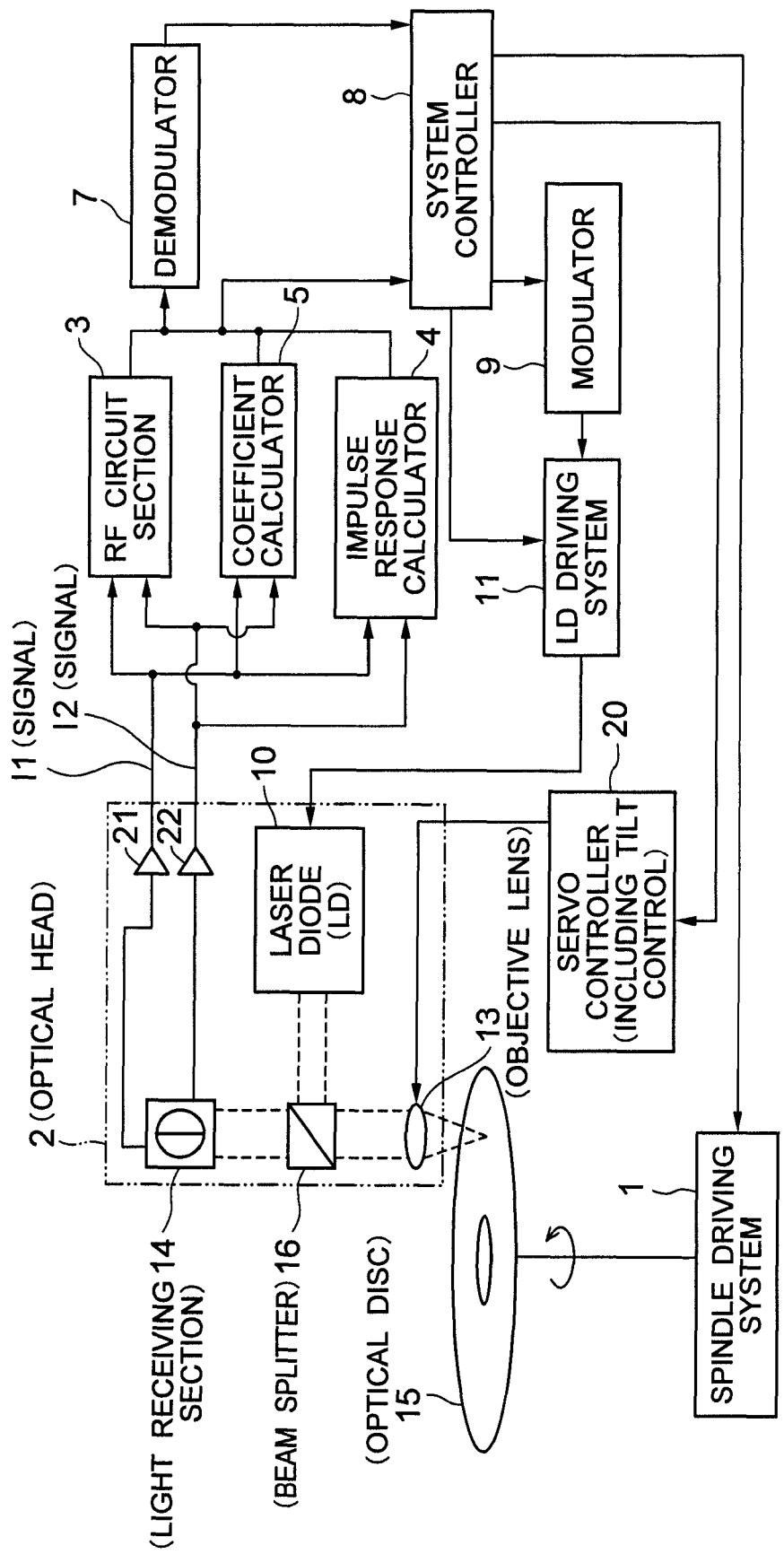
FIG. 1 A block diagram showing one exemplary embodiment of an information recording/reproducing apparatus according to the present invention.
Figure 2:
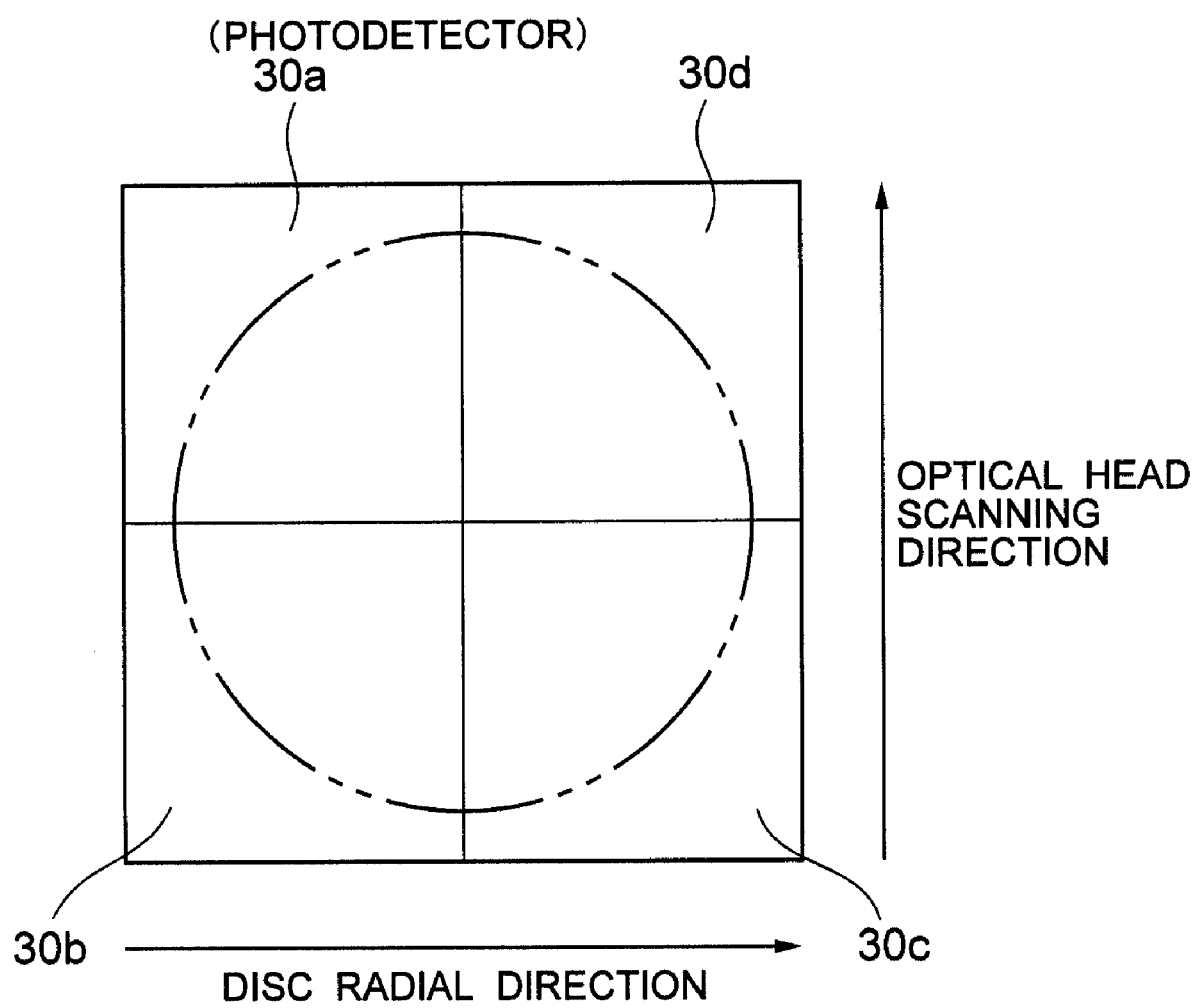
FIG. 2 A general plan view showing a quadrant photodetection section.
Figure 3:
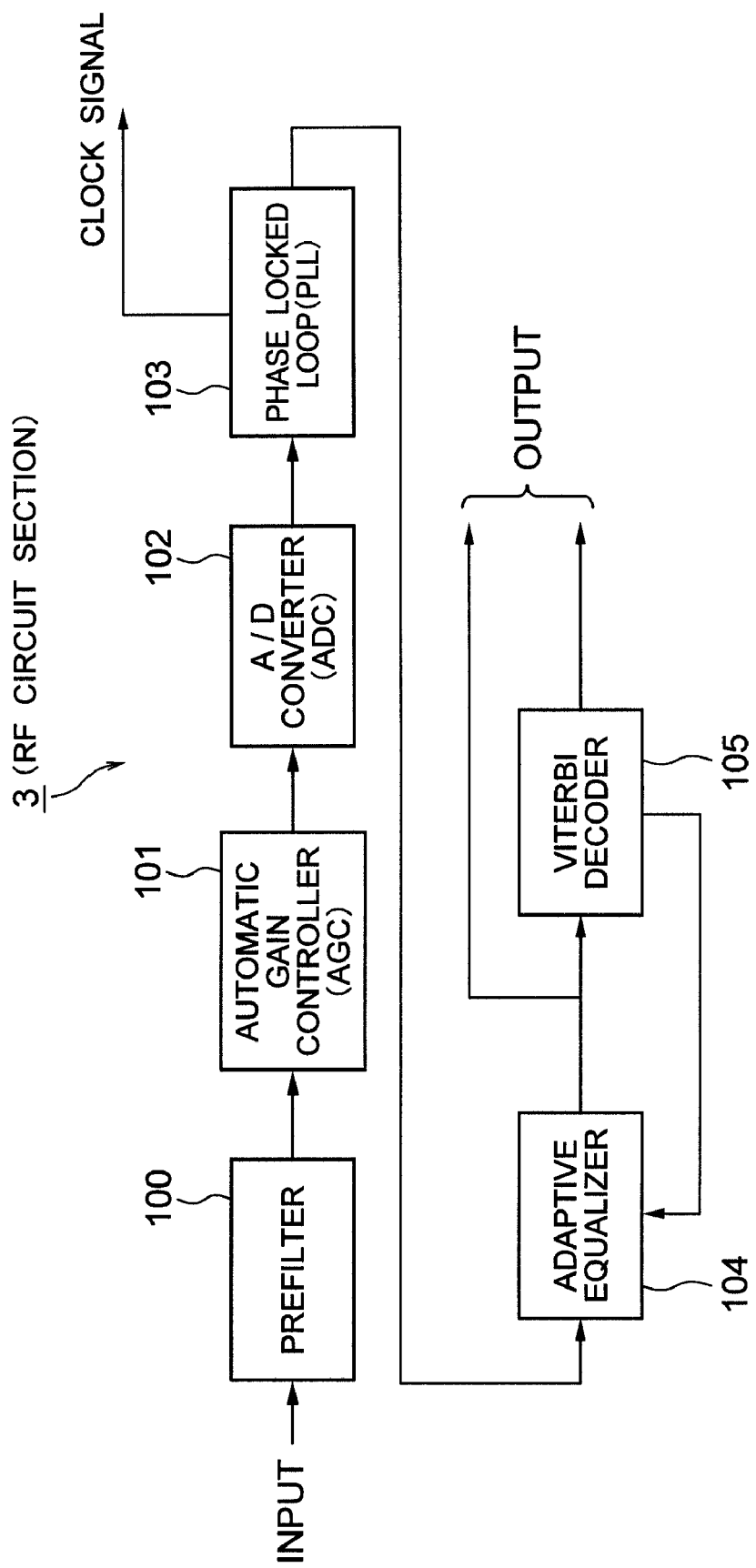
FIG. 3 A block diagram showing an RF circuit section in the information recording/reproducing apparatus of FIG. 1.
Figure 4:
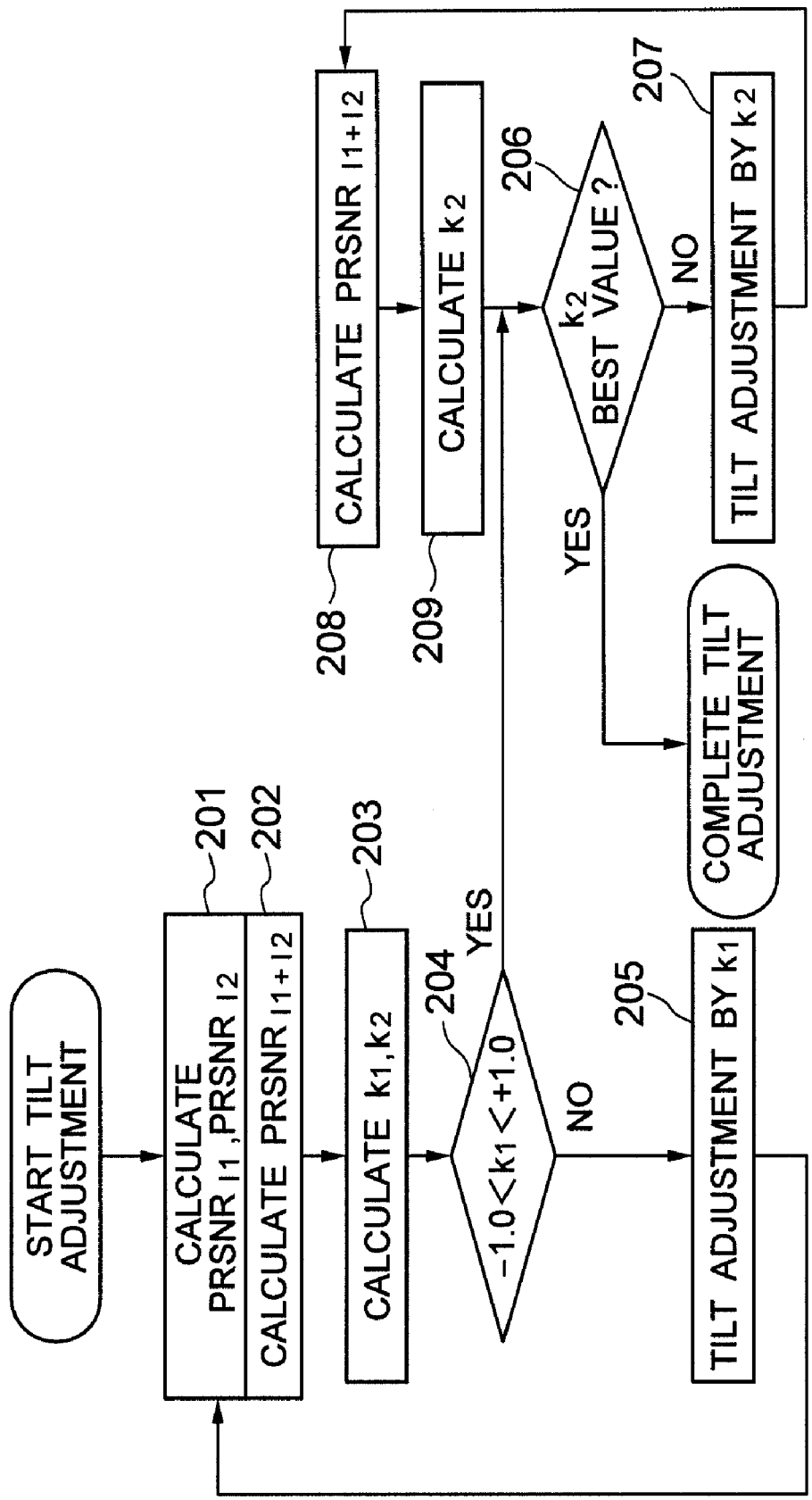
FIG. 4 A flowchart showing an operation of the information recording/reproducing apparatus of FIG. 1.
Figure 5:
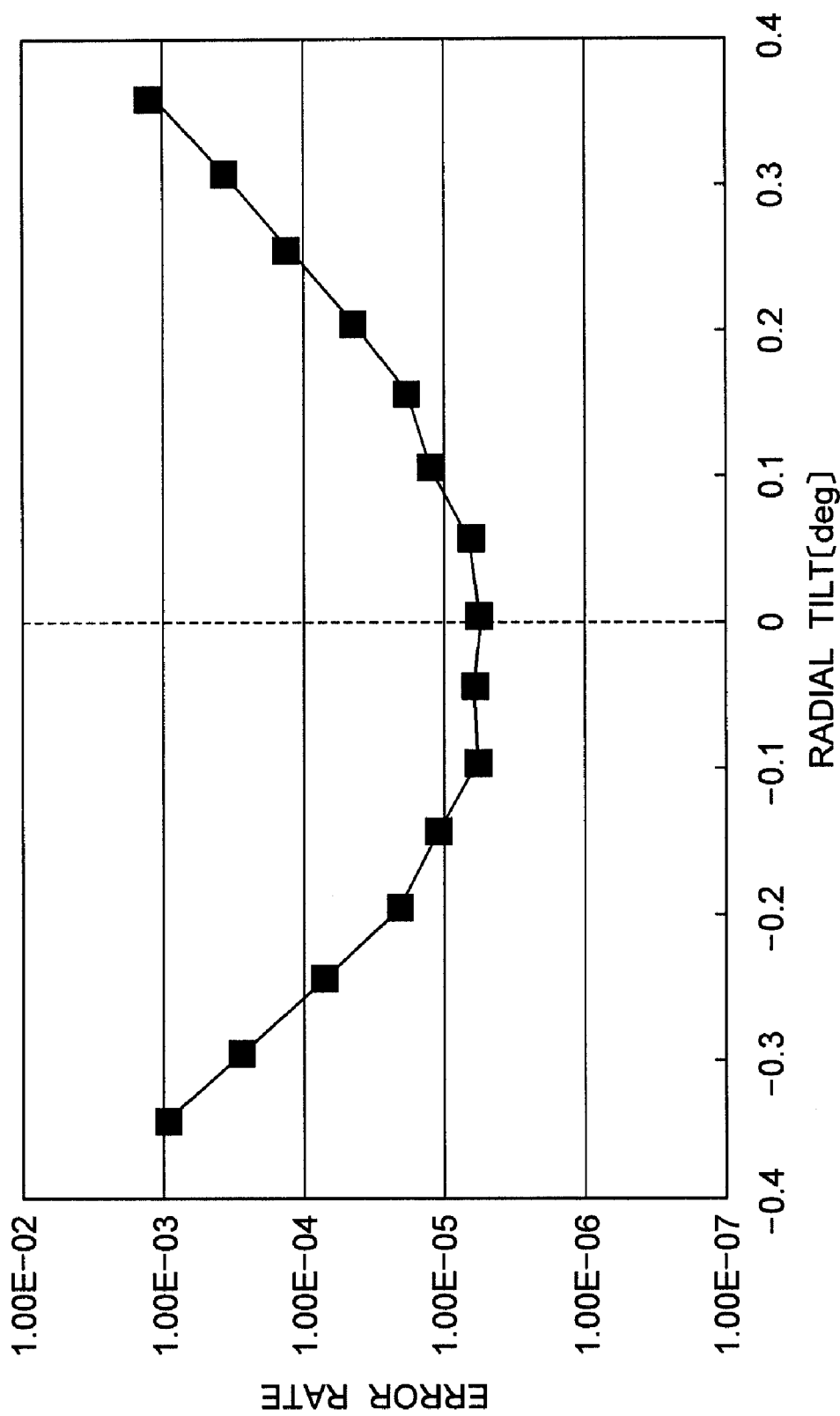
FIG. 5 A graph showing dependence of an error rate on a radial tilt.
Figure 6:
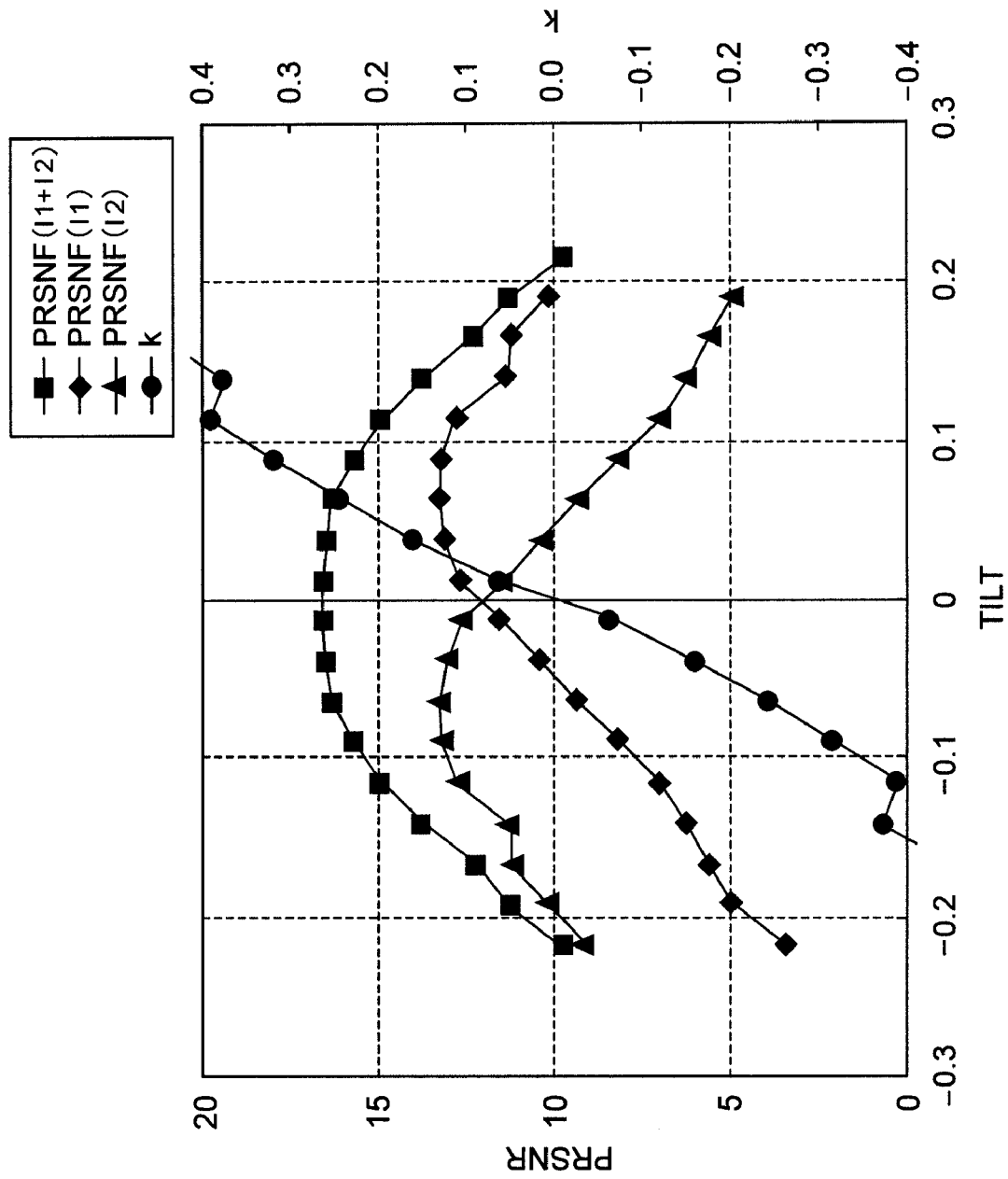
FIG. 6 A graph showing an ideal relationship between a PRSNR and a coefficient $k_1$.
Figure 7:
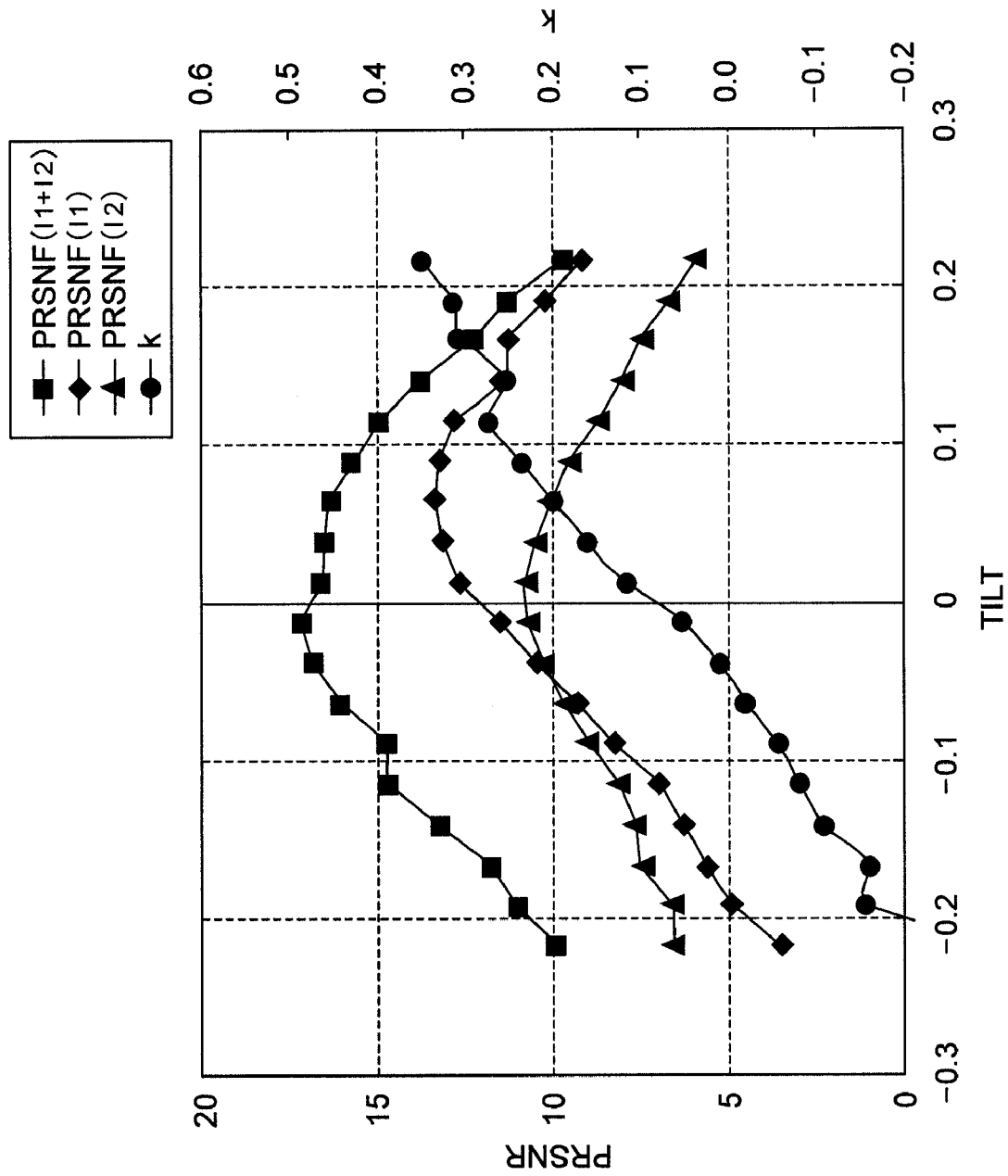
FIG. 7 A graph showing a first relationship between the PRSNR and the coefficient $k_1$.
Figure 8:
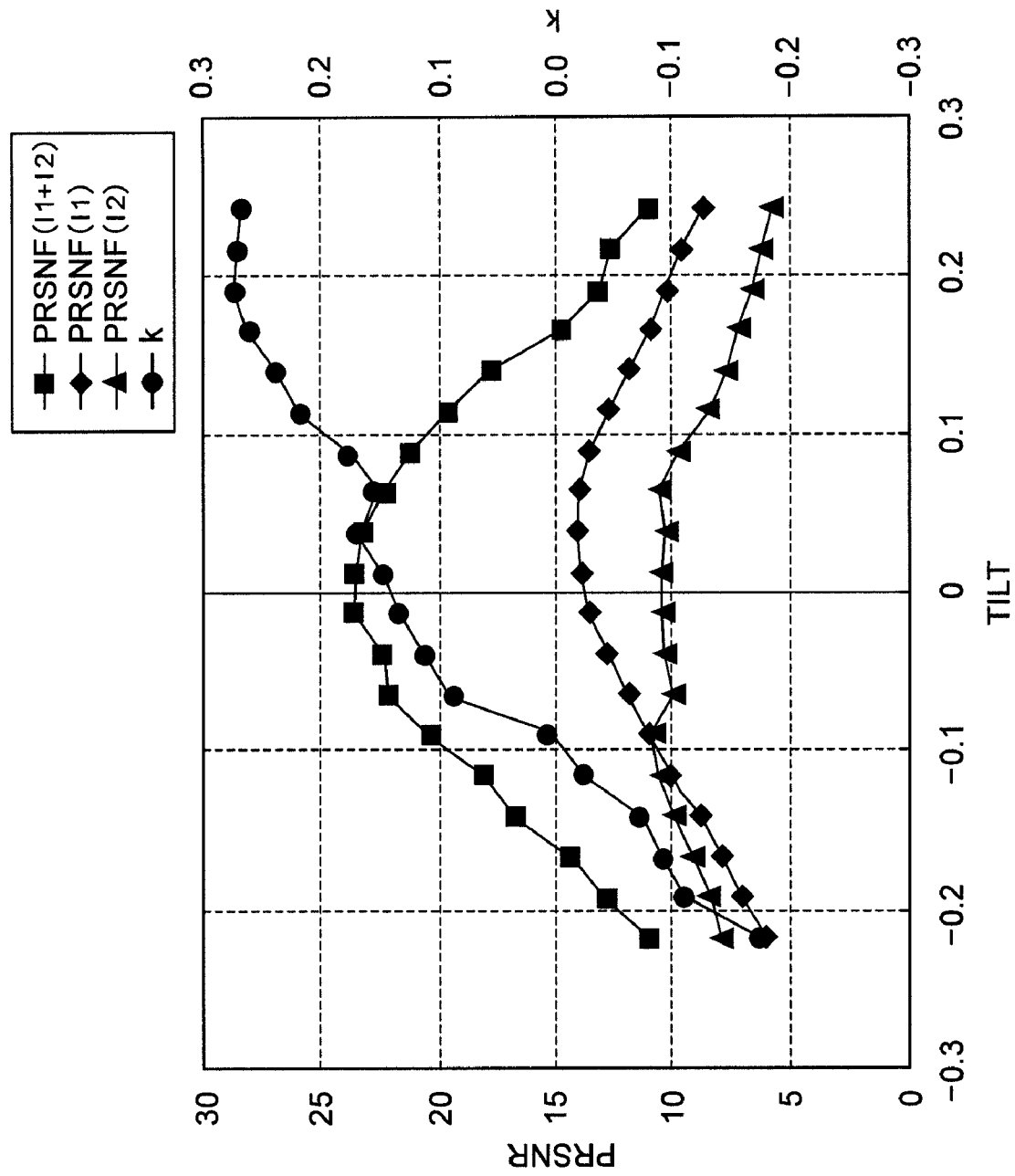
FIG. 8 A graph showing a second relationship between the PRSNR and the coefficient $k_1$.
Figure 9:
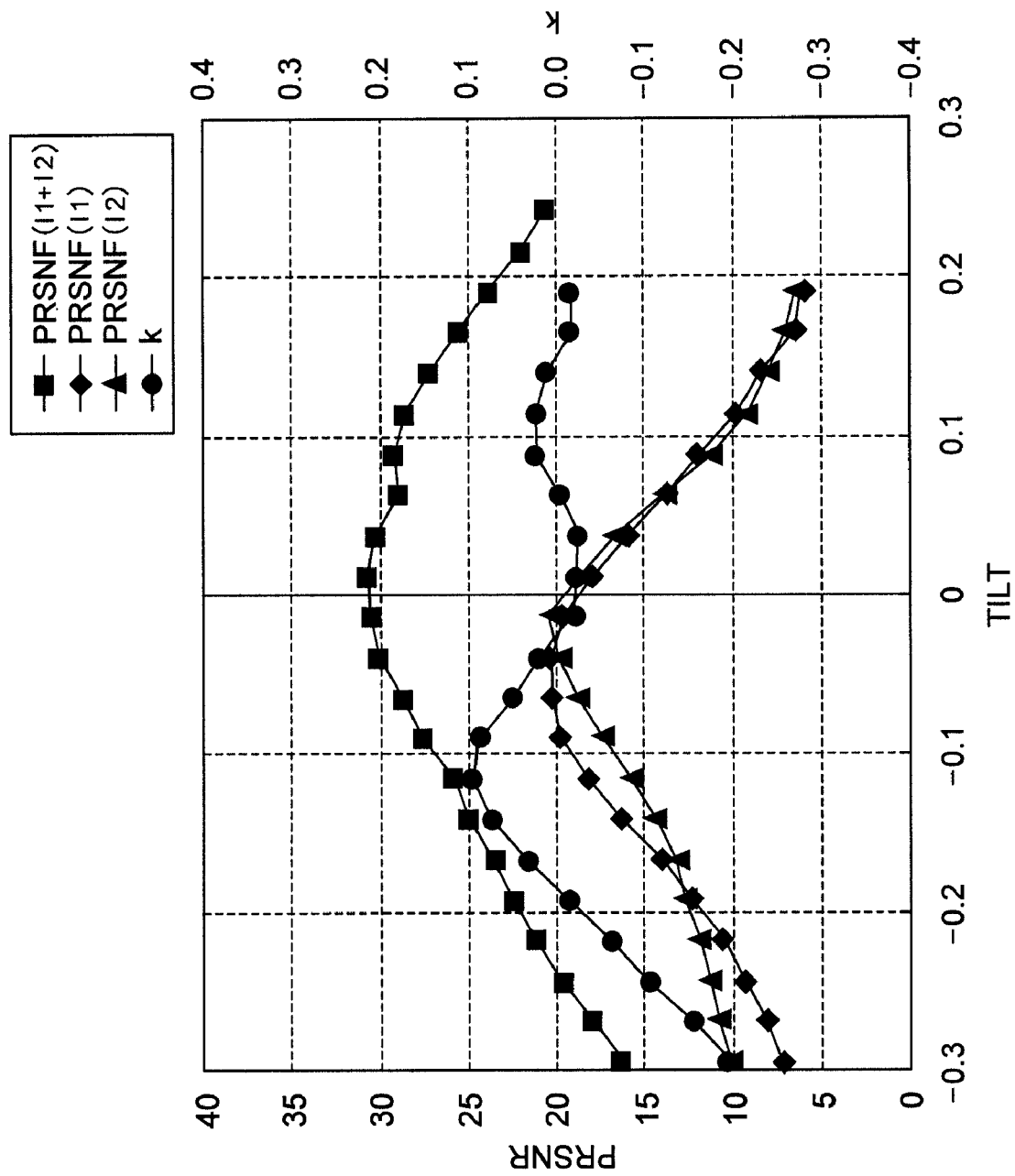
FIG. 9 A graph showing a third relationship between the PRSNR and the coefficient $k_1$.

1 SPINDLE DRIVING SYSTEM
2 OPTICAL HEAD (HEAD SECTION)
3 RF CIRCUIT
4 IMPULSE RESPONSE CALCULATOR
5 COEFFICIENT CALCULATOR (COEFFICIENT CALCULATING UNIT)
7 DECODER
8 SYSTEM CONTROLLER (PART OF TILT ADJUSTING UNIT)
9 MODULATOR
10 LASER DIODE
11 LD DRIVING SYSTEM
12 SERVO CONTROLLER
13 OBJECTIVE LENS
14 LIGHT RECEIVING SECTION
15 OPTICAL DISC (INFORMATION RECORDING MEDIUM)
16 BEAM SPLITTER
20 SERVO CONTROLLER (PART OF TILT ADJUSTING UNIT)
30a LIGHT RECEIVING SECTION A
30b LIGHT RECEIVING SECTION B
30c LIGHT RECEIVING SECTION C
30d LIGHT RECEIVING SECTION D
100 PREFILTER
101 AUTOMATIC GAIN CONTROLLER
102 A/D CONVERTER
103 PHASE-LOCKED LOOP
104 ADAPTIVE EQUALIZER
105 VITERBI DECODER

The invention claimed is:

1. A tilt adjusting method for adjusting a tilt angle which is generated by an actual incoming light beam and a reflected light beam with respect to an incoming light beam and a reflected light beam with an optimal tilt when recording and reproducing data onto/from an information recording medium, the method comprising:
calculating a first coefficient and a second coefficient by taking out two or more output signals in which signal component and noise component are in different balances with respect to a target parameter to be corrected, from the reproduction signal of the information recording medium, and by evaluating those signal component and noise component so as to perform signal correction;
performing tilt adjustment with the first coefficient when the first coefficient is out of a set reference range; and
performing tilt adjustment with the second coefficient when the first coefficient is in the set reference range.

2. The tilt adjusting method, as claimed in claim 1, wherein the two or more output signals are used independently or used partially added each portion so as to generate signals I1 and I2, and output signals including the signals I1 and I2 are added so as to generate a signal I3, and then the first coefficient is calculated by working out ratios between signal component and noise component for the respective signals I1, I2 and I3; and
the second coefficient is calculated by using a ratio between signal component and noise component worked out from the signal I3.

3. The tilt adjusting method, as claimed in claim 2, wherein $k_1$ is calculated by the equation, $k_1=A(SNR2-SNR1)$, $k_1=(SNR2-SNR1)/SNR3$, or $k_1=(SNR2-SNR1)/(SNR1+SNR2)$, and $k_2$ is calculated by the equation, $k_2=SNR3$, when the ratios between the signal component and the noise component in the signals I1, I2 and I3 are expressed by SNR1, SNR2, SNR3 respectively, and the first coefficient is expressed by $k_1$, the second coefficient is expressed by $k_2$, and a proportional constant is expressed by A.

4. The tilt adjusting method, as claimed in claim 3, wherein the SNR 1, the SNR 2, and the SNR3 are PRSNRs of the signals I1, I2 and I3 indicating an error index which is a ratio between an interval of paths where a Euclidean distance is short and an error occurs easily and a noise, and the ratio is calculated by using a reproduction signal according to combination of partial response equalization and maximum likelihood decoding.

5. The tilt adjusting method, as claimed in claim 1, wherein the reference range is set in a range over −0.1 and under +0.1.

6. The tilt adjusting method, as claimed in claim 1, wherein
a signal recorded on an information recording medium is divided and detected by a plurality of detector in a head section, and
the divided and detected signals are used independently or used by adding with each other to generate signals I1 and I2 to calculate the first coefficient corresponding to a difference between SN ratios of the signals I1 and I2, and the signal I3 which is a summation of at least the signals I1 and I2 is generated to calculate the second coefficient corresponding to an SN ratio of the signal I3.

7. An information recording/reproducing apparatus performing at least one of recording and reproducing with respect to an information recording medium, the apparatus comprising:
a head section for irradiating the information recording medium with an incoming light beam for recording, and for receiving a reflected light beam for reproducing;
a coefficient calculating unit for calculating a first coefficient and a second coefficient by performing signal correction by evaluating signal component and noise component of two or more output signals extracted from the reproduced signal which is outputted from the head section based on the reflected light beam, in which the signal component and the noise component are in different balances with respect to a target parameter to be corrected; and
a tilt adjusting unit for adjusting a tilt by using the first coefficient when the first coefficient is out of a set reference range, and by using the second coefficient when the first coefficient is in the set reference range.

8. The information recording/reproducing apparatus, as claimed in claim 7, wherein the coefficient calculating unit calculates,
the first coefficient by using signals I1 and I2 generated by the two or more output signals used independently or used by adding partially with each portion, and signal I3 generated by adding output signals including the signals I1 and I2 so as to calculate a ratio between signal component and noise component of the respective signals I1, I2 and I3, and
the coefficient 2 by using a ratio between signal component and noise component worked out from the signal I3.

9. The information recording/reproducing apparatus, as claimed in claim 8, wherein the coefficient calculation unit calculates, $$k_1=A(SNR2-SNR1), k_1=(SNR2-SNR1)/SNR3 \text{ or } k_1=(SNR2-SNR1)/(SNR1+SNR2), \text{ and } k_2=SNR3.$$

when the ratios between the signal component and the noise component of the signals I1, I2 and I3 are expressed by SNR1, SNR2 and SNR3, the first coefficient is expressed by $k_1$, the second coefficient is expressed by $k_2$, and a proportional constant is expressed by A.

10. The information recording/reproducing apparatus, as claimed in claim 9, wherein the SNR1, the SNR2, and the SNR3 are PRSNR of the signals I1, I2 and I3 that indicates an error index which is a ratio between a path interval, where Euclidean distance is short and an error easily occurs, and noise, calculated by using a reproduction signal according to combination of partial response equalization and maximum likelihood decoding.

11. The information recording/reproducing apparatus, as claimed in claim 7, wherein the tilt adjusting unit performs tilt control by setting the reference range over −0.1 and under +0.1.

12. An information recording/reproducing apparatus performing at least one of recording and reproducing with respect to an information recording medium, the apparatus comprising:

a head section for irradiating the information recording medium with an incoming light beam for recording, and for receiving a reflected light beam for reproducing;

a coefficient calculating means for calculating a first coefficient and a second coefficient by performing signal correction by evaluating signal component and noise component of two or more output signals extracted from the reproduced signal which is outputted from the head section based on the reflected light beam, in which the signal component and the noise component are in different balances with respect to a target parameter to be corrected; and a tilt adjusting means for adjusting a tilt by using the first coefficient when the first coefficient is out of a set reference range, and by using the second coefficient when the first coefficient is in the set reference range.

* * * * *